United States Patent
Lunz et al.

[19]

[11] Patent Number: 5,906,461
[45] Date of Patent: May 25, 1999

[54] MACHINE TOOL WITH ADJUSTABLE STRUT ASSEMBLY

[75] Inventors: Erich Lunz, Lonnerstadt; Helmut Bode, Herzogenaurach, both of Germany; Jean-Marie Eder, Woerth, France

[73] Assignee: INA Wälzlager Schaeffler oHG, Herzogenaurach, Germany

[21] Appl. No.: 09/108,979

[22] Filed: Jul. 1, 1998

Related U.S. Application Data

[63] Continuation of application No. PCT/EP97/01749, Apr. 9, 1997.

[51] Int. Cl.⁶ ............................................. B23C 1/06
[52] U.S. Cl. ..................... 409/201; 408/236; 409/216; 409/235
[58] Field of Search ................. 409/201, 211, 409/216, 235; 408/234, 236; 901/23, 24, 41

[56] References Cited

U.S. PATENT DOCUMENTS

| | | |
|---|---|---|
| 3,356,424 | 12/1967 | Edwards . |
| 3,398,999 | 8/1968 | Halvorsen . |
| 3,995,916 | 12/1976 | Lange et al. . |
| 4,293,166 | 10/1981 | Ernst et al. . |
| 4,988,244 | 1/1991 | Sheldon et al. ........................ 409/201 |
| 5,259,710 | 11/1993 | Charles . |
| 5,401,128 | 3/1995 | Lindem et al. . |
| 5,409,331 | 4/1995 | Vykukal . |
| 5,466,085 | 11/1995 | Sheldon et al. ........................ 409/201 |
| 5,538,373 | 7/1996 | Kirkham ................................ 409/201 |
| 5,556,242 | 9/1996 | Sheldon et al. ........................ 409/201 |
| 5,575,597 | 11/1996 | Bailey et al. ........................... 409/201 |
| 5,604,593 | 2/1997 | McMurtry ................................ 409/235 |

FOREIGN PATENT DOCUMENTS

| | | |
|---|---|---|
| 21 29 024 | 12/1971 | Germany . |
| 21 42 965 B2 | 3/1972 | Germany . |
| 21 16 638 | 10/1972 | Germany . |
| 22 09 170 | 8/1973 | Germany . |
| 26 18 535 A1 | 11/1977 | Germany . |
| 32 28 522 C2 | 3/1983 | Germany . |
| 87 12 696 U1 | 10/1987 | Germany . |
| 38 09 230 A1 | 10/1988 | Germany . |
| 38 15 852 A1 | 11/1989 | Germany . |
| 38 18 329 A1 | 12/1989 | Germany . |
| 44 38 815 A1 | 6/1996 | Germany . |

OTHER PUBLICATIONS

Rosheim Mark E.: Robot Wrist Actuators, John Wiley & Sons.

*Primary Examiner*—Daniel W. Howell
*Attorney, Agent, or Firm*—Henry M. Feiereisen

[57] ABSTRACT

A machine tool includes several telescopic struts, each of which being formed by an inner tube and outer tube arranged within one another. The telescopic struts are articulated at their one end to a frame and at their other end to a tool holder. The outer tube is formed with a plurality of circumferentially spaced recesses, with each of the recesses accommodating a recirculating ball bearing unit which includes a carrier body provided with endless ball tracks. Each endless ball track is divided in a load-bearing section and an unstressed, non-load-bearing return portion. The inner tube has ball tracks, with balls rolling along the ball tracks of the carrier body and the inner tube whereby the balls are guided from the load-bearing section into the return section.

7 Claims, 1 Drawing Sheet

MACHINE TOOL WITH ADJUSTABLE STRUT ASSEMBLY

CROSS-REFERENCES TO RELATED APPLICATIONS

This application is a continuation of prior filed copending PCT International application no. PCT/EP97/01749, filed Apr. 9, 1997.

BACKGROUND OF THE INVENTION

The present invention generally relates to a machine tool, and in particular is directed to a machine tool of a type having a plurality of telescopic struts, each being formed by an inner tube and an outer tube, which are nested within each other, and articulated at one end thereof to a frame and at the other end thereof to a tool holder for carrying a tool for machining a workpiece.

A machine tool of this type is known for example from U.S. Pat. No. 5,401,128 which combines a hexapodal tool holder that is mounted on nodes of an octahedral framework. This type of machine tool is self-contained, and, unlike conventional machine tools, moves smaller masses. As a result, the speeds of adjustment are higher, whereby, in particular, the rigidity between the frame and the tool holder is very high. In many cases, a total of six telescopic struts are provided, all of which can be independently retracted and extended. Thus, the tool holder can take any desired position in space. A high rigidity of the telescopic struts is of particular importance in such machine tools.

SUMMARY OF THE INVENTION

It is an object of the present invention to provide an improved machine tool of the afore-stated type, which is formed telescopic struts that are highly rigid and yet retractable and extendable at great ease and smoothness.

This object and others which will become apparent hereinafter are attained in accordance with the present invention by providing the outer tube with several circumferentially spaced recesses, with each of the recesses accommodating a recirculating ball bearing unit which includes a carrier body provided with an endless ball track having a load-bearing section which merges into a non-load-bearing return section, with balls of the bearing unit under load rolling in the load-bearing section of the ball track and in a further ball track formed on the inner tube in opposition to the load-bearing section and guided from the load-bearing section into the return section.

Such an arrangement assures a smooth sliding property of the telescopic struts while a relative rotation between the inner tube and the outer tube is prevented by the ball bearings. The length of the load-bearing section and thus also the number of balls that roll thereon is chosen to match the geometry of the telescopic strut and in accordance with the expected loads.

According to a preferred feature of the present invention, several pairs of ball tracks are arranged in spaced relationship about the circumference of the inner tube, whereby the neighboring ball tracks of each pair extend parallel to one another and are oppositely inclined. The carrier body of each recirculating ball bearing unit likewise includes complementary pairs of ball tracks so that, as seen in cross-section, two-rowed, angular contact ball bearings are formed, with the center lines of pressure of the ball rows preferably including an angle of about 90°.

According to another feature of the present invention, the outer tube defines a longitudinal axis and exhibits a wall which bounds the recess and serves as contact surface which, whereby the outer tube is formed with a tangential bore which is oriented transversely to the longitudinal axis and extends through the contact surface, with the carrier body being provided with a threaded bore which is coaxial to the tangential bore and is engaged by a screw inserted though the tangential bore, for urging the carrier body against the contact surface. Thus, the carrier body is pressed against the contact surface when the screw is tightened. If necessary, leveling shims can be arranged between the contact surface and the carrier body to obtain a perfect positioning of the carrier body.

In order to provide a radial support of the recirculating ball bearing unit, the outer tube has an outer surface which is formed with a flattened portion to serve as contact surface for attachment of a cover. As viewed in cross section, the cover preferably forms a circular segment of the outer tube. In this way, the outer tube has a smooth cylindrical outer surface area, without exposing any projecting parts and edges that pose a risk of injury. Suitably, the cover can be secured to the outer tube by screw fasteners.

BRIEF DESCRIPTION OF THE DRAWINGS

The above and other objects, features and advantages of the present invention will now be described in more detail with reference to the accompanying drawing in which.

DETAILED DESCRIPTION OF PREFERRED EMBODIMENTS

Figure 1:
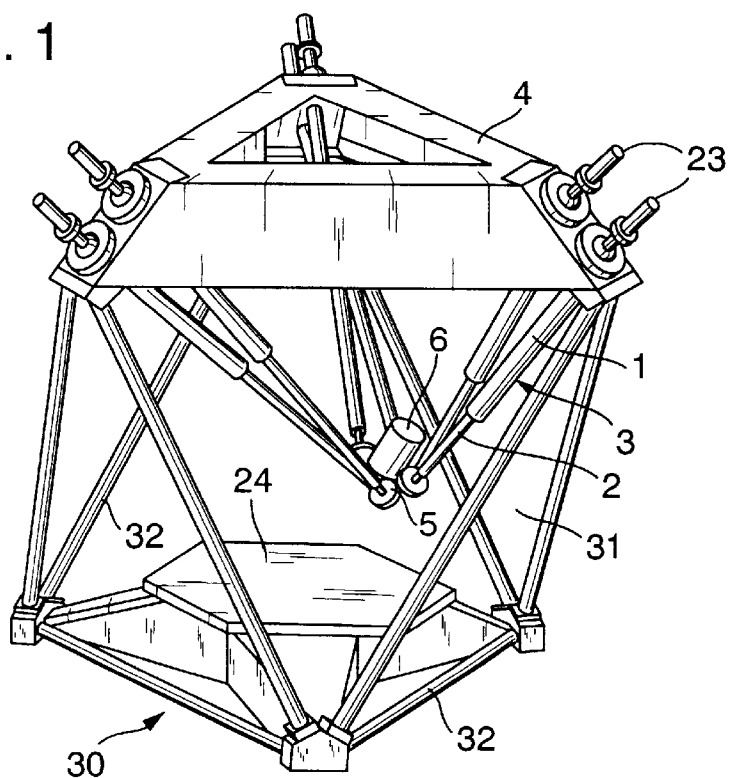
FIG. 1 is a perspective view of one embodiment of a machine tool according to the present invention.

Throughout all the Figures, same or corresponding elements are generally indicated by same reference numerals.

Turning now to the drawing, and in particular to FIG. 1, there is shown a perspective view of one embodiment of a machine tool according to the present invention, which includes a framework, generally designated by reference numeral 30 and formed by a plurality of triangular sections 31, each of which is comprised of three suitably connected beams 42, and a plurality of telescopic struts, generally designated by reference numeral 3 and provided in the form of outer and inner tubes 1, 2 nested within one another. The telescopic struts 3 are articulated at one end thereof to a strut-supporting frame 4, which is connected to the beams 32, and articulated at the other end thereof to a tool holder 5 which receives a tool (not shown) that is driven by a motor 6. The struts 3 are servostruts having servomotors 23 mounted at their one ends for telescopically moving the inner tube 2 within the outer tube 1. By selectively retracting or extending one or more of the telescopic struts 3, the tool holder 5 with the attached tool can be shifted into any desired position in space relative to a workpiece (not shown) which is placed on a platform 24. A specific construction and manner in which the machine tool is operated is fully described in U.S. Pat. No. 5,401,128, the entire specification and drawings of which are expressly incorporated herein by reference.

Figure 2:
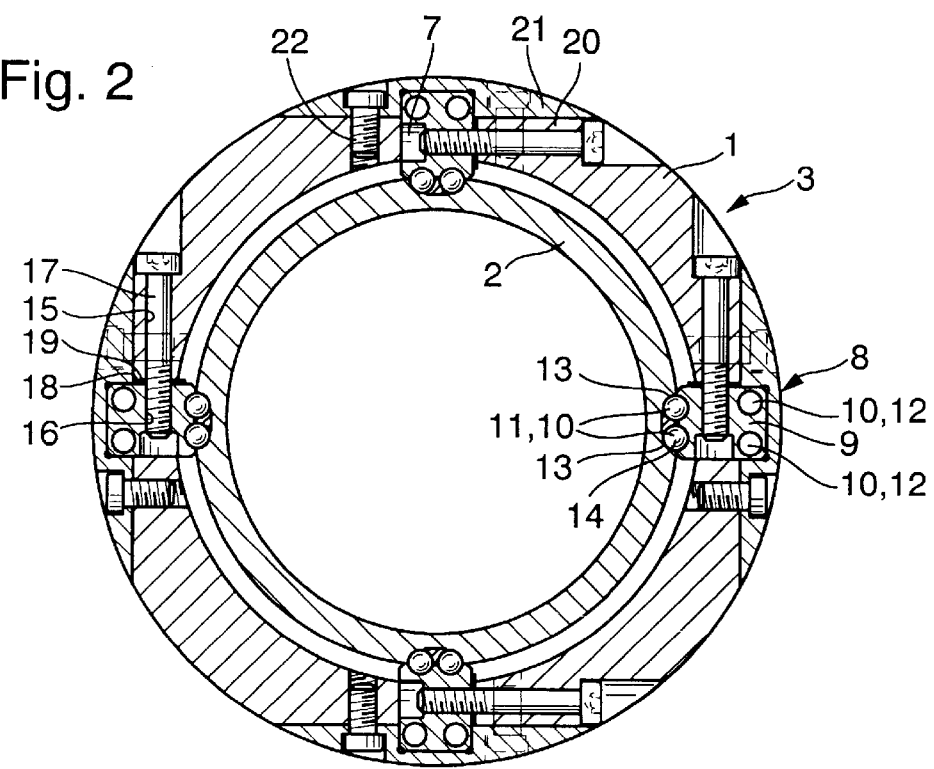
FIG. 2 is a cross sectional view of a telescopic strut of the machine tool of FIG. 1.

FIG. 2 shows a cross-section of a telescopic arm 3 of the machine tool illustrated in FIG. 1. The outer tube 1 is formed with several circumferentially spaced recesses 7 for receiving recirculating ball bearing units 8. Each of these recirculating ball bearing units 8 includes a carrier body 9 which is formed with two endless ball tracks 10 in side-by-side disposition for guiding a plurality of balls 14. The ball tracks 10 are so configured as to include two generally straight track sections 11 and 12 which are interconnected at their ends e.g. by two semicircular track sections, whereby track section 11 defines a load-bearing section in which the balls 14 are under load while track section 12 defines an unstressed or non-load-bearing return section 12. Provided at the inner tube 2 are several pairs of ball tracks 13 spaced from one another about the circumference of the inner tube 2, so that the balls 14 are in rolling contact within the ball tracks 10, 13 of the carrier body 9 and the inner tube 2 whereby the neighboring ball tracks 13 of each pair extend parallel to one another and are oppositely inclined. Thus, each recirculating ball bearing unit 8 includes, as seen in cross-section, two-rowed, angular contact ball bearings, with the center lines of pressure of the ball rows preferably including an angle of about 90°.

Persons skilled in the art will understand that the structure and operation of recirculating ball bearings is generally known and may come in various designs. Reference is made e.g. to German Pat. No. DE-A 26 18 535 which shows an example of a recirculating ball bearing.

As further shown in FIG. 2, the outer tube 1 has formed therein a tangential bore 15 which extends transversely of the longitudinal axis thereof. The carrier body 9 is provided with a threaded bore 16 which is coaxial to the tangential bore 15 and is engaged by a screw fastener 17 inserted through the tangential bore 15. A leveling shim 19 may suitably be arranged between a contact surface 18 of the recess 7 and the carrier body 9 and clamped between the carrier body 9 and the outer tube 1 when the screw 17 is tightened for effecting a secure and proper position of the carrier body 9. The leveling shim 9 should be of rigid structure and can be made of steel or suitable plastic material.

The outer surface area of the outer tube 1 is provided with a flattened portion 20 for attachment of a cover 21 which is so configured as to form a circular segment of the outer tube 1. Screw fasteners 22 are used to secure the cover 21 to the outer tube 1.

While the invention has been illustrated and described as embodied in a machine tool with adjustable strut assembly, it is not intended to be limited to the details shown since various modifications and structural changes may be made without departing in any way from the spirit of the present invention.

What is claimed as new and desired to be protected by Letters Patent is set forth in the appended claims:

1. A machine tool, comprising:
    a frame;
    a plurality of telescopic struts articulated at one end thereof to the frame and at another end thereof to a tool holder, each of the struts being formed by an inner tube arranged within an outer tube, said outer tube including several circumferentially spaced recesses; and
    a plurality of recirculating ball bearing units, each of the ball bearing units being disposed in a corresponding one of the recesses of the outer tube, whereby the ball bearing units and the recesses are placed into one-to-one correspondence, wherein each of the ball bearing units includes a carrier body provided with an endless ball track divided in a load-bearing section and a non-load-bearing return section connected to the load-bearing section, and a plurality of balls rolling under load in the load-bearing section of the ball track and in a further ball track formed on the inner tube in opposition to the load-bearing section, and rolling under no load when guided in the return section.

2. The machine tool of claim 1 wherein the inner tube is provided with a plurality of pairs of such ball tracks spaced from one another about the periphery of the inner tube, with neighboring ball tracks of each pair extending parallel to each other and being oppositely inclined.

3. The machine tool of claim 1 wherein the outer tube defines a longitudinal axis, said outer tube defining a contact surface which bounds the recess, and being formed with a tangential bore which is oriented transversely to the longitudinal axis and extends through the contact surface, said carrier body being provided with a threaded bore which is coaxial to the tangential bore, and further comprising a screw fastener insertable through the tangential bore for engagement in the threaded bore for urging the carrier body against the contact surface.

4. The machine tool of claim 3, and further comprising at least one leveling shim arranged between the contact surface and the carrier body.

5. The machine tool of claim 1, and further comprising a cover, said outer tube having an outer surface which is formed with a flattened portion to serve as contact surface for attachment of the cover to support the carrier body in a radial direction.

6. The machine tool of claim 5 wherein the cover, as seen in cross section, forms a circular segment of the outer tube.

7. The machine tool of claim 6, and further comprising fastening means for securing the cover to the outer tube.

\* \* \* \* \*